May 13, 1941.  J. W. HARRIS  2,242,067
DOLLY
Filed Feb. 23, 1940   2 Sheets-Sheet 1
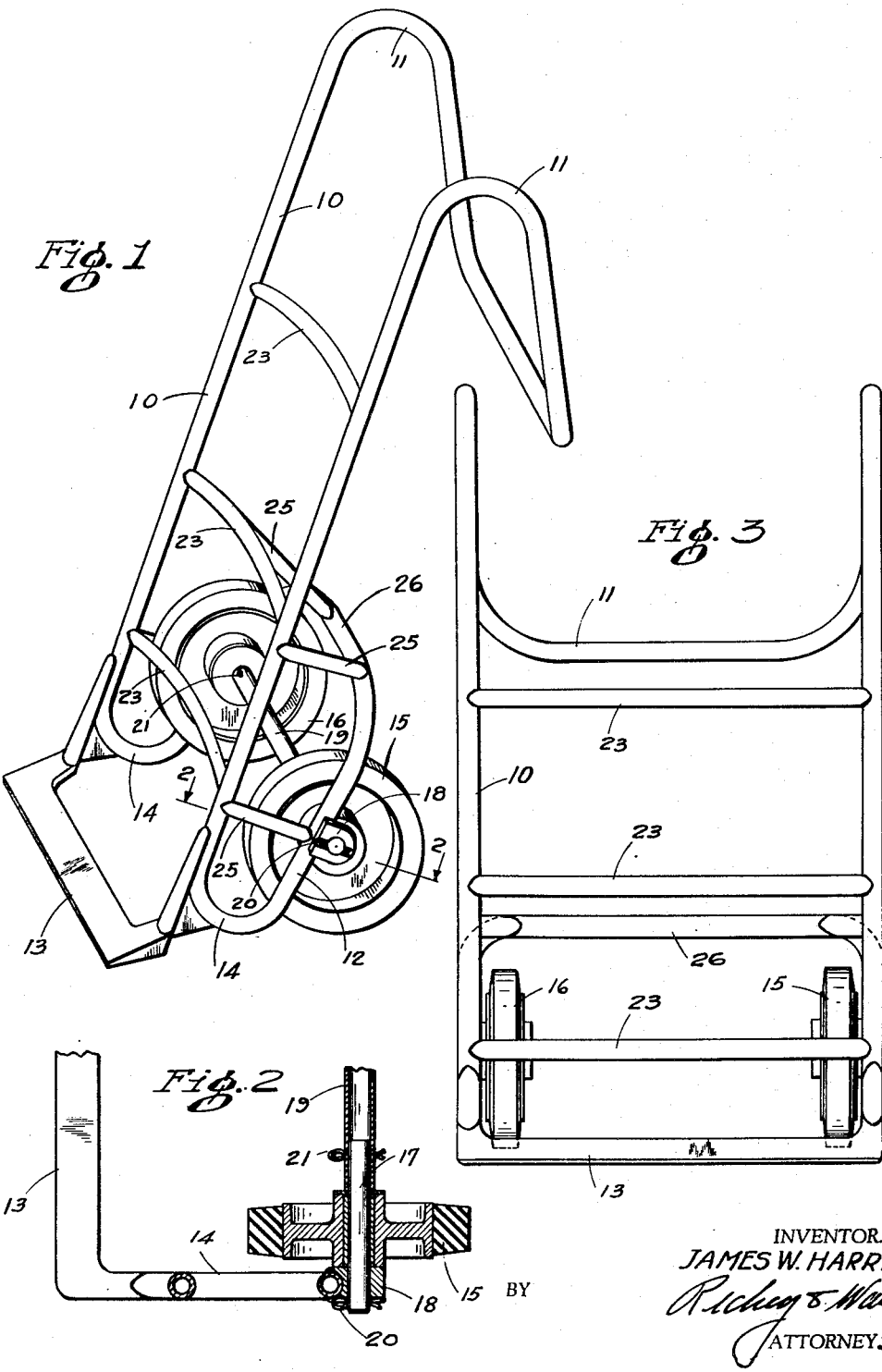
INVENTOR.
JAMES W. HARRIS,
BY
ATTORNEYS.

May 13, 1941.  J. W. HARRIS  2,242,067
DOLLY
Filed Feb. 23, 1940  2 Sheets-Sheet 2
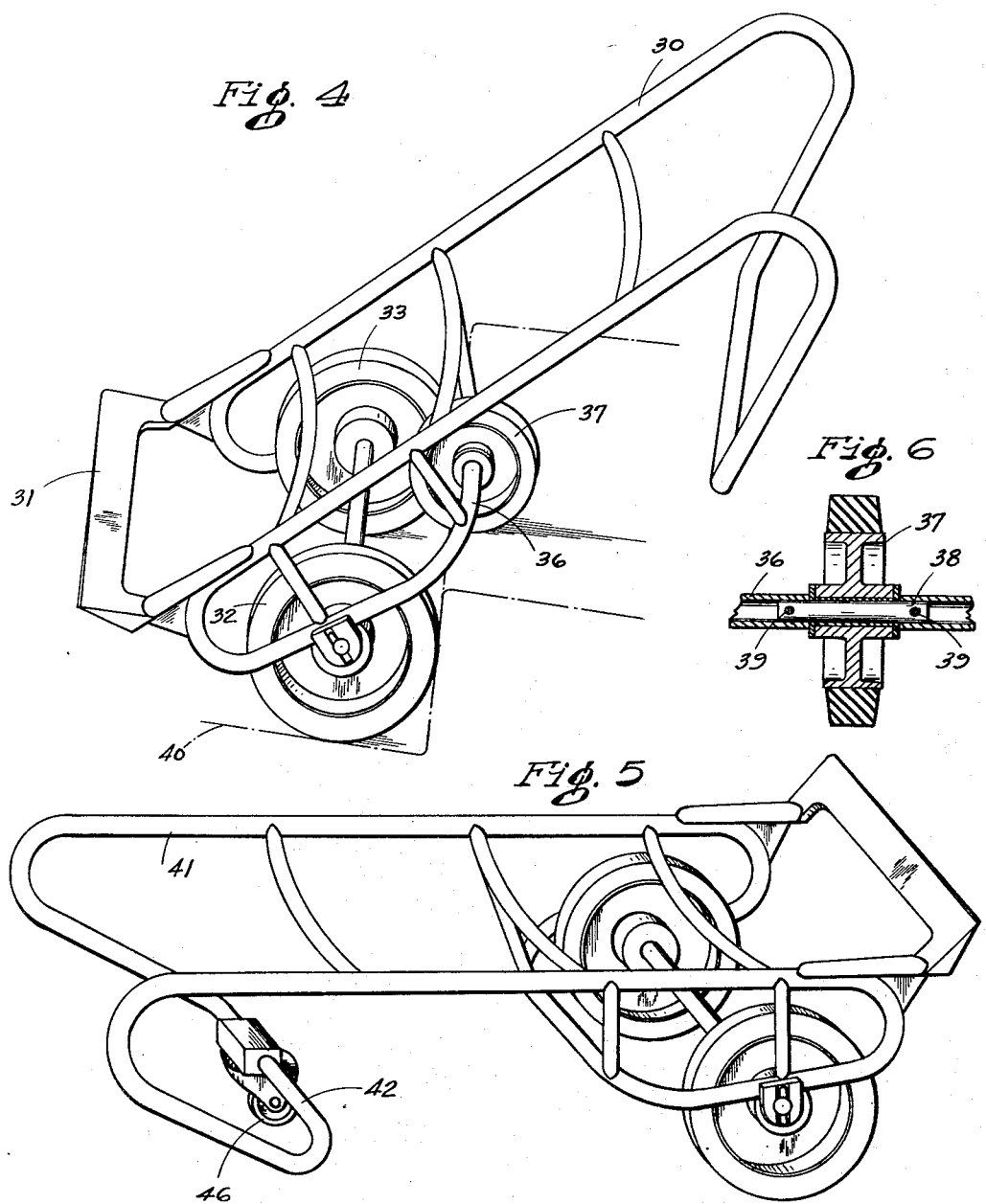
INVENTOR.
JAMES W. HARRIS
BY
ATTORNEYS.

Patented May 13, 1941

2,242,067

UNITED STATES PATENT OFFICE 2,242,067

DOLLY

James W. Harris, Bedford, Ohio, assignor to The Palode Engineering Company, Cleveland, Ohio, a corporation of Ohio Application February 23, 1940, Serial No. 320,274

4 Claims. (Cl. 280—54)

This invention relates broadly to dollies and more specifically to improvements in the structural form thereof and the novel character of the materials employed therein.

One of the objects of the invention is to provide a dolly in which the chassis or frame is formed from a looped single length of light gauge steel tubing.

Another object of the invention is to construct the frame side rails with arcuate end portions constituting hand grips for the dolly and to provide a frame cross member from the extended portions of the tube forming the hand grips.

Another object of the invention is to construct a dolly frame structure having the lower end portion thereof bent in the plane of the side rails to provide a supporting medium for the wheels to provide a second frame cross member for the dolly.

Another object of the invention is to provide a dolly frame structure having the portion adjacent the hand grips extended downwardly to form a rest or leg for the support of the dolly in a horizontal position.

Another object of the invention is to provide a wheel or roller upon the lower frame cross member to facilitate the elevation of the dolly over shear obstructions such as a curb.

Another object of the invention is to provide a dolly which is economic of manufacture, rigid of structure and capable of supporting relatively heavy loads.

Other objects and advantages more or less ancillary of the foregoing and the manner in which all the various objects are realized will appear in the following description which, considered in connection with the accompanying drawings, sets forth the preferred embodiment of the invention.

Referring to the drawings wherein the preferred embodiment of the invention is shown:

Fig. 1 is an isometric view of the improved dolly showing the preferred form of the invention;

Fig. 2 is a fragmentary view of a portion of the frame member, the toe plate and one of the wheels, the view being shown partially in section as indicated by line 2—2 in Fig. 1;

Fig. 3 is a top plan view of the dolly shown in Fig. 1;

Fig. 4 is an isometric view of a modified form of the improved dolly embodying the invention;

Fig. 5 is an isometric view of a dolly showing another modified form of the invention; and Fig. 6 is a sectional view showing the structure of the support for the auxiliary wheel shown in Figs. 4 and 5.

Referring to Fig. 1, wherein the preferred form of the dolly construction is shown, the frame member 10 is formed from a single length of light gauge steel tubing which is bent in the form of a continuous loop having one of the end portions thereof rebent to form the handles 11 while the opposed end 12 is rebent to form a wheel supporting structure. As shown in Figs. 1 and 2 a toe plate 13 is welded or otherwise secured to the end 12 of the frame above the arcuate section 14. The wheels 15 and 16 are mounted on stub axles 17 supported in pillow blocks 18 welded to a lineal portion of the frame beyond the arcuate sections 14 thereof. The wheels are held in spaced relation by engagement of their hub portions with a tube 19 mounted upon the inner ends of the axles 17. As shown in Fig. 2, the pillow blocks 18 are constructed to conform to the tube and are preferably attached to the frame through a welded connection therewith. The stub axles 17 are restrained from longitudinal movement by pins 20 and 21 mounted respectively in the blocks 18 and spacer tube 19.

The dolly chassis embodies a plurality of frame cross members 23 welded to the side rails 10 in spaced relation with each other to form the load supporting rack or platform. When the dolly is designed for a specific use the cross members 23 may be formed to the configuration of the article constituting the load. The side rails 10 and the rearwardly extending section 12 of the frame are sustained in spaced relation by the struts 25 which, as shown, are preferably disposed above the wheels and adjacent the end portion of the inner loop intermediate the rails 10 and section 12.

In loading an article upon the dolly the toe plate 13 is inserted under an edge thereof in the customary manner. However, the subsequent lifting and tilting operation may be greatly facilitated by application of pressure from the operator's foot against the transverse frame cross member 26 of the end 12, since such operation affords not only a greater mechanical advantage in lifting the load but also restrains rearward movement of the dolly as the load is fulcrumed about the wheels in lifting the article. Moreover, since the dolly is constructed of light gauge steel tubing and is consequently relatively light in weight the burden upon the operator in lifting and operating the dolly is appreciably reduced.

In the modified form shown in Fig. 4, the frame member 30 is formed of a single piece of light gauge steel tubing with the toe plate 31 and wheels 32 and 33 secured thereto in a manner similar to that heretofore described.

In this embodiment, however, the transverse frame member 36 is provided with a wheel 37 which serves as a fulcrum in lifting the dolly over a curb or similar obstruction. As shown in Fig. 6, the wheel 37 is mounted upon a rod 38 telescopically engaged with the ends of a severed section of the tube 36, the rod or axle being secured therein by pins 39.

The modified form of the invention shown in Fig. 5 is similar in structure to the design illustrated in Fig. 4, save that a caster wheel 46 is mounted in the end portion 42 of the frame cross member 41. With this construction the dolly may be supported with the platform in a horizontal plane so that relatively large or heavy objects may be moved with greater ease and facility.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A dolly comprising, a frame member constructed from light gauge tubing bent to form parallel side rails and continuous arcuate end portions constituting lateral cross members, a plurality of transverse frame members affixed to said side rails, one of said end portions being bent downwardly forming arcuate vertical hand grips rearwardly said cross members, the opposed end of said frame being bent downwardly and rearwardly forming a wheel supporting member, wheels mounted on the rearwardly extending portion of said member forwardly said cross members and a toe plate secured to the arcuate end portion of said frame adjacent said wheels.

2. A dolly comprising, a frame member, axles mounted thereon, wheels on said axles, said frame member embodying a tube bent to form a continuous loop having parallel sides and arcuate end portions constituting respectively frame side rails and cross members, one of said arcuate end portions being bent downwardly and rearwardly to provide a support for said axles forwardly of said cross members.

3. A dolly comprising a frame member embodying a single length of light gauge steel tubing bent to form a continuous loop having parallel sides and ends, one end portion of the frame member being bent downwardly to provide hand grips, the other end portion of the frame member being bent downwardly and extending rearwardly substantially parallel to the side frame members to provide a wheel supporting member, an axle mounted on said rearwardly extending portion, wheels mounted on the axle, vertical struts intermediate the side frame members and said wheel supporting member, and an auxiliary wheel journaled on one of said ends superjacent said axle.

4. A dolly comprising a frame member formed of a single length of relatively light gauge steel tubing bent to form a continuous loop having parallel sides and downwardly curved end portions constituting respectively frame side members and frame cross members, one of said end portions having wheels mounted thereon, vertical struts superjacent said wheels for reinforcing said frame side members, the opposed end portion of the frame member being curved downwardly, forming arcuate vertical hand grips and extending forwardly in angular relation to the frame side members to support the end of the frame member in a substantially horizontal position and a toe plate secured to the frame member adjacent said wheels.

JAMES W. HARRIS.